United States Patent
Kato et al.

(10) Patent No.: US 10,899,009 B2
(45) Date of Patent: Jan. 26, 2021

(54) MACHINE LEARNING DEVICE, NUMERICAL CONTROL DEVICE, MACHINE TOOL, AND MACHINE LEARNING METHOD

(71) Applicant: Mitsubishi Electric Corporation, Tokyo (JP)

(72) Inventors: Yuta Kato, Tokyo (JP); Taichi Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 62 days.

(21) Appl. No.: 16/339,722

(22) PCT Filed: Jul. 6, 2018

(86) PCT No.: PCT/JP2018/025747
§ 371 (c)(1),
(2) Date: Apr. 4, 2019

(87) PCT Pub. No.: WO2020/008634
PCT Pub. Date: Jan. 9, 2020

(65) Prior Publication Data
US 2020/0009735 A1    Jan. 9, 2020

(51) Int. Cl.
*B25J 9/16* (2006.01)
*G05B 19/4155* (2006.01)
*G06N 20/00* (2019.01)

(52) U.S. Cl.
CPC ............ *B25J 9/1669* (2013.01); *B25J 9/163* (2013.01); *B25J 9/1612* (2013.01); *B25J 9/1682* (2013.01); *G05B 19/4155* (2013.01); *G06N 20/00* (2019.01)

(58) Field of Classification Search
CPC . B25J 9/161; B25J 9/1612; B25J 9/163; B25J 9/1653; B25J 9/1656; B25J 9/1664; B25J 9/1669; B25J 9/1682; B25J 9/1692; B23B 31/00–42; G05B 19/4155; G05B 2219/39505; G05B 2219/40451; G05B 2219/40463; G05B 2219/40465;
(Continued)

(56) References Cited

FOREIGN PATENT DOCUMENTS

JP    2006-159354 A    6/2006
JP    2014-004651 A    1/2014
(Continued)

OTHER PUBLICATIONS

International Search Report and Written Opinion dated Sep. 25, 2018 for PCT/JP2018/025747 filed on Jul. 6, 2018, 8 pages (including Written Opinion English Translation).
(Continued)

*Primary Examiner* — Spencer D Patton
(74) *Attorney, Agent, or Firm* — Xsensus LLP

(57) ABSTRACT

A machine learning device that learns a waiting time for at least one of grasping of a workpiece by a spindle chuck and releasing of the workpiece by a loader chuck during transfer of the workpiece between the spindle chuck—that grasps and sends the workpiece and the loader chuck that grasps and receives the workpiece. The machine learning device includes a state observing unit that observes the waiting time and a FB current from a drive unit that moves the loader chuck as state variables, and a learning unit that learns the waiting time with which a transfer time of the workpiece is shortened, in accordance with a data set created based on the state variables.

11 Claims, 6 Drawing Sheets

(58) Field of Classification Search
CPC ........... G05B 2219/40466; G05B 2219/39357; G05B 2219/39358; G05B 2219/39361; G05B 2219/39144; G05B 2219/41192
See application file for complete search history.

(56) References Cited

FOREIGN PATENT DOCUMENTS

| JP | 2016-002601 A | 1/2016 |
| JP | 2016-135523 A | 7/2016 |
| JP | 2017-107398 A | 6/2017 |
| WO | 2017/077607 A1 | 5/2017 |

OTHER PUBLICATIONS

Office Action dated Sep. 25, 2020 in Chinese Patent Application No. 201880004274.4, 12 pages.

MACHINE LEARNING DEVICE, NUMERICAL CONTROL DEVICE, MACHINE TOOL, AND MACHINE LEARNING METHOD

CROSS-REFERENCE TO RELATED APPLICATIONS

The present application is based on PCT filing PCT/JP2018/025747, filed Jul. 6, 2018, which is incorporated herein by reference.

FIELD

The present invention relates to a machine learning device, a numerical control device that learns transfer operation of a workpiece, a machine tool, and a machine learning method.

BACKGROUND

In a machine tool such as a lathe, in operation of transfer of a workpiece between a chuck of grasping and sending a workpiece and a chuck of grasping and receiving the workpiece, the chuck of sending the workpiece needs to release the workpiece after the chuck of receiving the workpiece securely grasps the workpiece. To reliably transfer the workpiece between the chucks, if a waiting time is prolonged from a start of closing operation by the chuck of receiving the workpiece to a start of releasing the workpiece by the chuck of sending the workpiece, it takes a long time for the transfer of the workpiece. For this reason, it is desired to complete the transfer of the workpiece in a short time.

In a clamp control device described in Patent Literature 1, at the time of transfer of a workpiece, a chuck of receiving the workpiece performs closing operation while performing rotational swinging about an axis of the workpiece, and when the swinging of the chuck is stopped by grasping of the workpiece by the chuck of receiving the workpiece, it is determined that the grasping of the workpiece is completed, and the chuck of sending the workpiece releases the workpiece.

CITATION LIST

Patent Literature

Patent Literature 1: Japanese Patent Application Laid-open No. 2016-135523

SUMMARY

Technical Problem

However, in Patent Literature 1, it is necessary to perform the closing operation at a low speed so that the workpiece is not scratched when the chuck grasps the workpiece while rotationally swinging; consequently, it takes time for the closing operation of the chuck. For that reason, there is a problem in that it is impossible to complete the transfer of the workpiece in a short time.

The present invention has been made in view of the above, and it is an object to obtain a machine learning device enabled to complete transfer of a workpiece in a short time.

Solution to Problem

There is provided a machine learning device to learn a waiting time for at least one of grasping of a workpiece by a second chuck or releasing of the workpiece by a first chuck during transfer of the workpiece between the first chuck to grasp and send the workpiece and the second chuck to grasp and receive the workpiece, the machine learning device according to an aspect of the present invention including: a state observing unit to observe the waiting time and a feedback current from a drive mechanism that moves the first chuck, as state variables; and a learning unit to learn the waiting time with which a transfer time of the workpiece is shortened, in accordance with a data set created based on the state variables.

Advantageous Effects of Invention

The machine learning device according to the present invention has an effect that transfer of a workpiece can be completed in a short time.

DESCRIPTION OF EMBODIMENTS

Hereinafter, an embodiment will be described in detail of a machine learning device, a numerical control device, a machine tool, and a machine learning method according to an embodiment of the present invention with reference to the drawings. Incidentally, the invention is not limited to the embodiment.

EMBODIMENT

Figure 1:
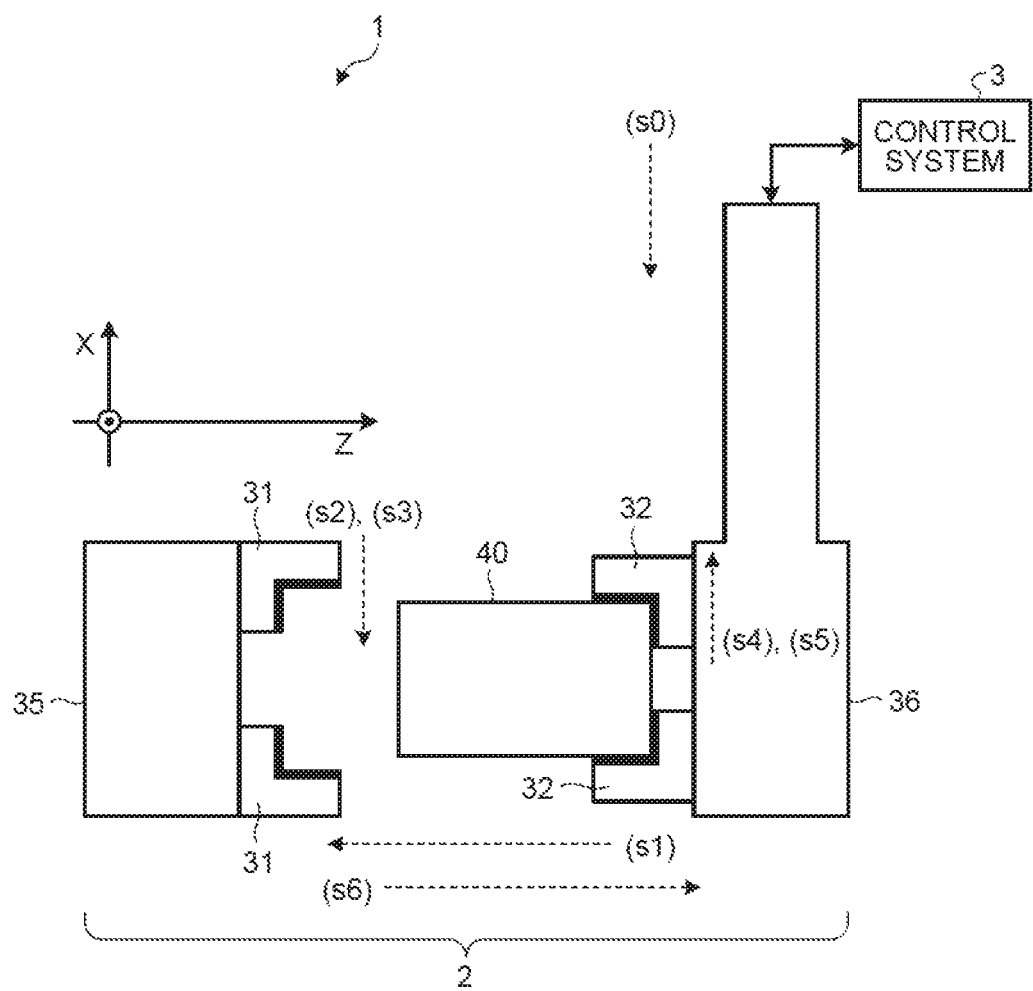
FIG. 1 is a diagram illustrating a configuration of a machining system according to an embodiment.

FIG. 1 is a diagram illustrating a configuration of a machining system according to an embodiment. FIG. 1 illustrates a case where a machining system 1 is viewed from the vertical direction. In the present embodiment, a case will be described where the vertical direction is the Y axis direction, the horizontal directions that are moving directions of a workpiece 40 are the X axis direction and the Z axis direction.

The machining system 1 includes a machine tool 2 that machines the workpiece 40, and a control system 3 that controls operation of the machine tool 2. Examples of the machine tool 2 are a lathe and a machining center. In the following, a case will be described where the machine tool 2 is a lathe.

The machine tool 2 includes a rotating part 35, a loader chuck 32 that is a first chuck, a spindle chuck 31 that is a second chuck, and a loader 36 that is a conveying mechanism for the workpiece 40. Operation of the loader 36 is controlled by the control system 3. The loader chuck 32 is connected to the loader 36 and moves together with the loader 36. The loader chuck 32 can grasp the workpiece 40 that is an object to be machined. Examples of the loader chuck 32 are a three-jaw chuck and a collet chuck. The loader chuck 32 transfers the workpiece 40 to the spindle chuck 31 when the machining of the workpiece 40 is started, and receives the workpiece 40 from the spindle chuck 31 after the machining of the workpiece 40 is completed.

The rotating part 35 rotates about the Z axis that is a spindle axis as a rotation axis. The spindle chuck 31 is connected to the rotating part 35 and rotates together with the rotating part 35. The spindle chuck 31 can grasp the workpiece 40. Examples of the spindle chuck 31 are a three-jaw chuck and a collet chuck. When the workpiece 40 is machined, the rotating part 35 rotates while the spindle chuck 31 grasps the workpiece 40 to rotate the workpiece 40. An example of the rotating part 35 is a spindle mechanism.

At the time of loading the workpiece 40 on the rotating part 35, the machine tool 2 grasps one end of the workpiece 40 with the loader chuck 32. In this state, the loader 36 moves to the minus side in the X axis direction and stops at a position facing the spindle chuck 31 (s0). Then, the loader 36 moves to the minus side in the Z axis direction. As a result, the loader 36 moves the workpiece 40 to a position where the spindle chuck 31 can grasp the workpiece 40 (s1). The position of the loader 36 at which the spindle chuck 31 can grasp the workpiece 40 is a desired transfer position. The machine tool 2 gives a command of closing operation to the spindle chuck 31 using an auxiliary function such as an M code to cause the spindle chuck 31 to start the closing operation (s2), and after giving the command of the closing operation, waits for a time during which the spindle chuck 31 is considered to complete grasping of the workpiece 40 (s3). The time during which the spindle chuck 31 is considered to complete the grasping of the workpiece 40 is a grasp waiting time 61 to be described later. When the grasp waiting time 61 has elapsed, the grasping is completed of the other end of the workpiece 40 by the spindle chuck 31.

After the grasp waiting time 61 that is a first waiting time has elapsed and further it is confirmed that the workpiece spindle chuck 31 has grasped the workpiece 40, the machine tool 2 gives a command of opening operation to the loader chuck 32 and causes the loader chuck 32 to start the opening operation (s4), and after giving the command of the opening operation, waits for a time during which the loader chuck 32 is considered to complete releasing of the workpiece 40 (s5). The time during which the loader chuck 32 is considered to complete the releasing of the workpiece 40 is a release waiting time 62 to be described later. When the release waiting time 62 that is a second waiting time has elapsed, the releasing of the workpiece 40 by the loader chuck 32 is completed. After the release waiting time 62 has elapsed and further it is confirmed that the loader chuck 32 has released the workpiece 40, the loader 36 moves to the plus side in the Z axis direction. As a result, the loader 36 retreats in a direction away from the workpiece 40 (s6) and further moves to the plus side in the X axis direction.

When the machining of the workpiece 40 is completed, the machine tool 2 unloads the workpiece 40 from the rotating part 35 by processing reverse to processing from s0 to s6 described above. In this case, processes from s0 to s6 are performed in the reverse direction. That is, in the processing of s0 and s6, the moving directions of the loader 36 are opposite to each other at the time of loading and unloading. In addition, at the time of unloading, closing operation of the loader chuck 32 and opening operation of the spindle chuck 31 are performed.

Specifically, at the time of unloading, the loader 36 moves to the minus side in the X axis direction and further moves in the direction to approach the workpiece 40. Then, the loader chuck 32 starts the closing operation and waits for the grasp waiting time 61. After the grasp waiting time 61 has elapsed and it is confirmed that the loader chuck 32 has grasped the workpiece 40, the spindle chuck 31 starts the opening operation and waits for the release waiting time 62. After the release waiting time 62 has elapsed and it is confirmed that the workpiece spindle chuck 31 has released the workpiece 40, the loader 36 retreats in the direction away from the workpiece 40 and further moves to the plus side in the X axis direction.

Incidentally, the grasp waiting time 61 for loading the workpiece 40 to the rotating part 35 and the grasp waiting time 61 for unloading the workpiece 40 from the rotating part 35 may be different times from each other. In addition, the release waiting time 62 for loading the workpiece 40 to the rotating part 35 and the release waiting time 62 for unloading the workpiece 40 from the rotating part 35 may be different times from each other. Because processing of loading the workpiece 40 to the rotating part 35 is similar to processing of unloading the workpiece 40 from the rotating part 35, in the following, the processing will be described of loading the workpiece 40 to the rotating part 35.

The machine tool 2 has a machine-specific peculiarity in processing of grasping the workpiece 40, conveying processing, and the like. For this reason, a time from when the command of closing operation is given to the spindle chuck 31 until the closing operation is completed, and a time from when the command of opening operation is given to the loader chuck 32 until the opening operation is completed vary for each machine tool 2.

In the present embodiment, a numerical control (NC) device 10 to be described later included in the control system 3 learns the grasp waiting time 61 and release waiting time 62 appropriate that are used when the loader chuck 32 tries to transfer the workpiece 40 to the spindle chuck 31. That is, the numerical control device 10 learns the grasp waiting time 61 and the release waiting time 62 to reduce wasteful waiting time, thereby shortening the transfer time of the workpiece 40. Incidentally, the control system 3 may learn one of the grasp waiting time 61 or the release waiting time 62. That is, the control system 3 learns at least one of the grasp waiting time 61 or the release waiting time 62.

Figure 2:
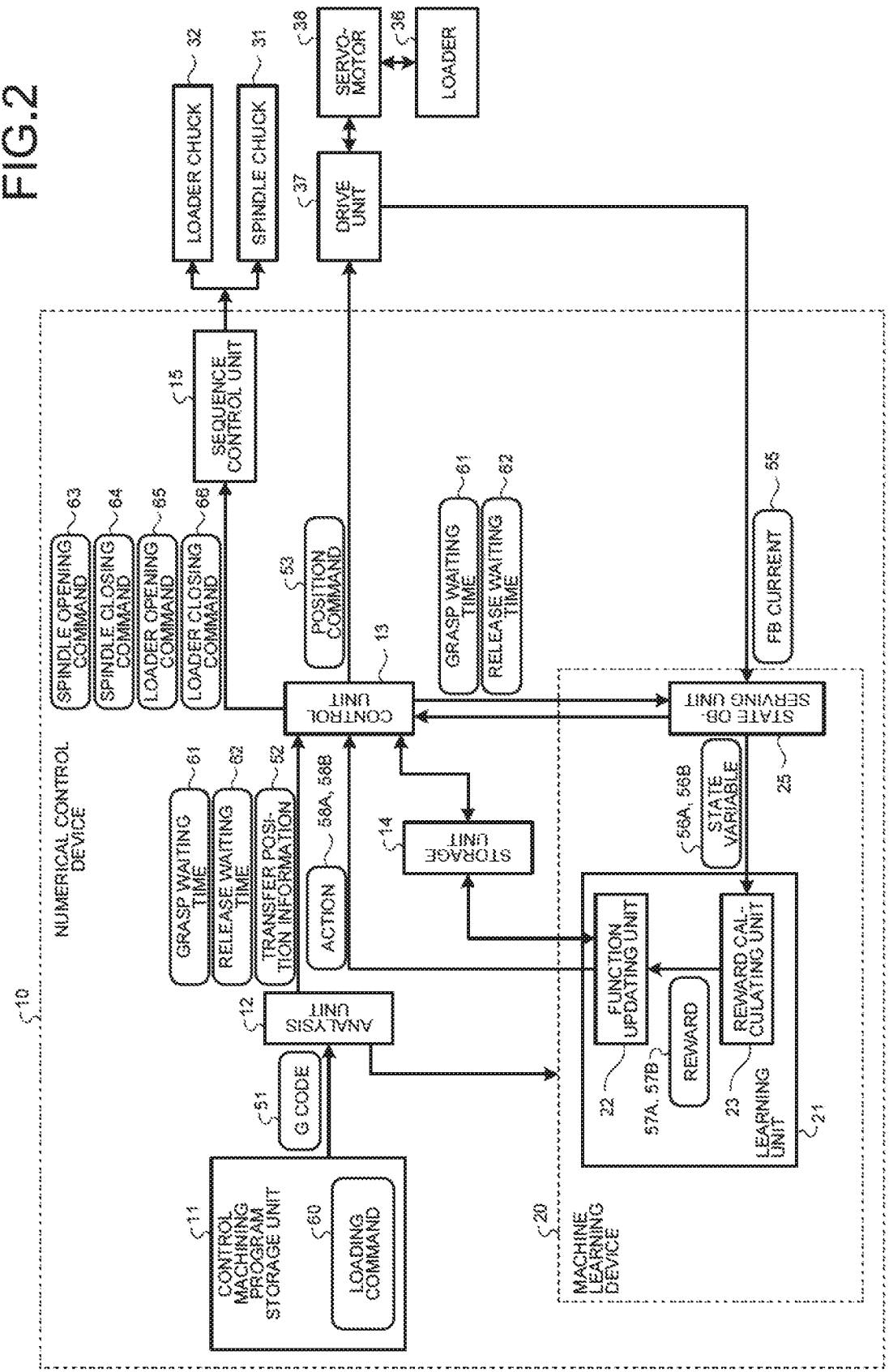
FIG. 2 is a diagram illustrating a configuration of a control system including a numerical control device according to the embodiment.

Next, a configuration will be described of the numerical control device 10 that controls operation of the machine tool 2. FIG. 2 is a diagram illustrating a configuration of the control system including the numerical control device according to the embodiment. The control system 3 includes the numerical control device 10, a drive unit 37, and a servomotor 38. The loader 36, the loader chuck 32, and the spindle chuck 31 illustrated in FIG. 2 are constituent elements of the machine tool 2.

The numerical control device 10 is a computer that controls the position of the loader 36 by sending a position command 53 to the drive unit 37. The position command 53 sent by the numerical control device 10 to the drive unit 37 is a command specifying the position of the loader 36 and includes a position command in the X axis direction and a position command in the Z axis direction. The numerical control device 10 controls transfer of the workpiece 40 from the loader chuck 32 to the spindle chuck 31, and when the transfer of the workpiece 40 is unsuccessful, the numerical control device 10 changes the grasp waiting time 61 and the release waiting time 62 to control the transfer again.

The numerical control device 10 pulls back the loader chuck 32 to the plus side in the Z axis direction after the grasp waiting time 61, and learns the grasp waiting time 61 appropriate, based on a current value of a current sent to the servomotor 38 at the time of pulling back. In addition, the numerical control device 10 pulls back the loader chuck 32 to the plus side in the Z axis direction after the release waiting time 62, and learns the release waiting time 62 appropriate, based on a current value of a current sent to the servomotor 38 at the time of pulling back.

The drive unit 37 is a drive mechanism that moves the loader 36 by driving the servomotor 38. The drive unit 37 calculates a value of a current to be sent to the servomotor 38, based on the position command 53 from the numerical control device 10. The drive unit 37 drives the servomotor 38 by sending the current corresponding to the position command 53 to the servomotor 38. The drive unit 37 sends to the numerical control device 10 a feedback (FB) current 55 that is data indicating the current to be sent to the servomotor 38.

The servomotor 38 is connected to the loader 36, and moves the loader 36 in accordance with the current from the drive unit 37. The servomotor 38 includes a servomotor that moves the loader 36 in the X axis direction, and a servomotor that moves the loader 36 in the Z axis direction.

The numerical control device 10 includes a control machining program storage unit 11, an analysis unit 12, a control unit 13, a storage unit 14, a sequence control unit 15, and a machine learning device 20. The control machining program storage unit 11 stores a control machining program to be used when the workpiece 40 is machined. The control machining program includes a loading command 60 for loading the workpiece 40 to the rotating part 35, a machining command for machining the workpiece 40, and an unloading command for unloading the workpiece 40 from the rotating part 35. In FIG. 2, the loading command 60 is illustrated. Among these commands, the loading command 60 and the unloading command are dedicated commands for performing the transfer of the workpiece 40. The loading command 60 is sent to the analysis unit 12, as a G code 51 for positioning the loader 36.

The analysis unit 12 analyzes the control machining program. The analysis unit 12 determines whether or not the command analyzed is a dedicated command, and in a case where it is the dedicated command such as the loading command 60, generates transfer position information 52 indicating a position where the workpiece 40 is transferred, the grasp waiting time 61, and the release waiting time 62, based on the G code 51. The transfer position information 52 is information on the position where the workpiece 40 is transferred between the chucks of the loader chuck 32 and the spindle chuck 31. Specifically, the transfer position information 52 is an end point of the loader 36. At the time of executing the first transfer of the workpiece 40, information to be used for transfer operation is set by using arguments of the dedicated command.

The dedicated command includes command arguments from (A1) to (A9) below.
(A1) The grasp waiting time 61
(A2) The release waiting time 62
(A3) A reference current value C1 that is a criterion as to whether or not grasping is determined to be completed
(A4) A movement amount L1 of the loader chuck 32 to be used for confirmation operation of grasping
(A5) A reference current value C2 that is a criterion as to whether or not releasing is determined to be completed
(A6) A movement amount L2 of the loader chuck 32 to be used for confirmation operation of releasing
(A7) Function numbers X1 and X2 of opening and closing auxiliary functions to the spindle chuck 31
(A8) Function numbers Y1 and Y2 of opening and closing auxiliary functions to the loader chuck 32
(A9) The end point of the loader 36 that is the transfer position information 52 on the workpiece 40

The grasp waiting time 61 of (A1) described above is a waiting time from when the command of closing operation is given to the spindle chuck 31 until a command is given for performing confirmation operation of completion of grasping by the spindle chuck 31.

The release waiting time 62 of (A2) is a waiting time from when the command of opening operation is given to the loader chuck 32 until a command is given for performing confirmation operation of completion of releasing by the spindle chuck 31.

The reference current value C1 of (A3) is a value for determining whether or not the grasping by the spindle chuck 31 is completed, and is compared with the FB current 55 that is the current sent to the servomotor 38. The FB current 55 in the present embodiment indicates the current sent to the servomotor that moves the loader 36 in the Z axis direction in the servomotor 38. A case where the FB current 55 less than the reference current value C1 is sent to the servomotor 38 is a case where the spindle chuck 31 does not grasp the workpiece 40 and the loader chuck 32 pulls back the workpiece 40.

The movement amount L1 of (A4) is a distance in which the loader chuck 32 grasping the workpiece 40 is pulled back to the plus side in the Z axis direction for confirmation of completion of the grasping by the spindle chuck 31.

The reference current value C2 of (A5) is a value for determining whether or not the releasing by the loader chuck 32 is completed, and is compared with the FB current 55 that is the current sent to the servomotor 38. A case where the FB current 55 greater than the reference current value C2 is sent to the servomotor 38 is a case where the loader chuck 32 does not release the workpiece 40 and the loader chuck 32 tries to pull back the workpiece 40.

The movement amount L2 of (A6) is a distance in which the loader chuck 32 is pulled back to the plus side in the Z axis direction for confirmation of completion of the releasing by the loader chuck 32.

The function number X1 of (A7) is a number indicating a spindle opening command 63 that is an opening command to the spindle chuck 31, and the function number X2 is a number indicating a spindle closing command 64 that is a closing command to the spindle chuck 31. In addition, the function number Y1 of (A8) is a number indicating a loader opening command 65 that is an opening command to the loader chuck 32, and the function number Y2 is a number indicating a loader closing command 66 that is a closing command to the loader chuck 32. In addition, the transfer position information 52 of (A9) includes an X coordinate and a Z coordinate.

The analysis unit 12 sends to the control unit 13 the grasp waiting time 61 of (A1), the release waiting time 62 of (A2), the movement amount L1 of (A4), the movement amount L2 of (A6), the function numbers X1 and X2 of (A7), the function numbers Y1 and Y2 of (A8), and the transfer position information 52 of (A9). In addition, the analysis unit 12 sends to the machine learning device 20 the reference current value C1 of (A3) and the reference current value C2 of (A5). Incidentally, not limited to a case where values of the command arguments are acquired from the dedicated command, the analysis unit 12 may acquire values corresponding to the command arguments from a parameter. In this case, information corresponding to the command arguments is stored as the parameter in the storage unit 14.

The control unit 13 generates the position command 53 in accordance with the transfer position information 52 sent from the analysis unit 12. The control unit 13 sends the position command 53 to the drive unit 37. In addition, at the time of the first transfer of the workpiece 40, the control unit 13 generates the spindle opening command 63, the spindle closing command 64, the loader opening command 65, and the loader closing command 66 in accordance with the grasp waiting time 61 and the release waiting time 62 sent from the analysis unit 12, and sends the commands to the sequence control unit 15. The control unit 13 measures a time specified by the grasp waiting time 61 and a time specified by the release waiting time 62 by a software timer. In the following description, the spindle opening command 63, the spindle closing command 64, the loader opening command 65, or the loader closing command 66 may be referred to as an opening/closing command.

In addition, at the time of the second and subsequent transfer of the workpiece 40, the control unit 13 generates the opening/closing command in accordance with actions 58A and 58B given from the machine learning device 20. The action 58A is the grasp waiting time 61 of the next time, and the action 58B is the release waiting time 62 of the next time. The control unit 13 sends to the machine learning device 20 the grasp waiting time 61 and the release waiting time 62 that have been actually used.

When receiving from the analysis unit 12 an instruction in which the function number X1 is specified, the control unit 13 generates the spindle opening command 63 corresponding to the function number X1, and sends the command to the sequence control unit 15. In addition, when receiving from the analysis unit 12 an instruction in which the function number X2 is specified, the control unit 13 generates the spindle closing command 64 corresponding to the function number X2, and sends the command to the sequence control unit 15. In addition, when receiving from the analysis unit 12 an instruction in which the function number Y1 is specified, the control unit 13 generates the loader opening command 65 corresponding to the function number Y1, and sends the command to the sequence control unit 15. In addition, when receiving from the analysis unit 12 an instruction in which the function number Y2 is specified, the control unit 13 generates the loader closing command 66 corresponding to the function number Y2, and sends the command to the sequence control unit 15.

After causing the spindle chuck 31 to perform closing operation, when receiving from the machine learning device 20 a notification indicating that the FB current 55 is greater than or equal to the reference current value C1, the control unit 13 causes the loader chuck 32 to start opening operation.

After causing the spindle chuck 31 to perform closing operation, when receiving from the machine learning device 20 a notification indicating that the FB current 55 is less than the reference current value C1, the control unit 13 causes the chuck 31 to perform opening operation, and then causes the chuck 31 to re-execute closing operation.

After causing the loader chuck 32 to perform opening operation, when receiving from the machine learning device 20 a notification indicating that the FB current 55 is less than or equal to the reference current value C2, the control unit 13 causes the loader 36 to start retreat operation.

After causing the loader chuck 32 to perform opening operation, when receiving from the machine learning device 20 a notification indicating that the FB current 55 is greater than the reference current value C2, the control unit 13 causes the sequence control unit 15 to perform closing operation of the loader chuck 32, and then causes the sequence control unit 15 to re-execute opening operation of the loader chuck 32.

The machine learning device 20 includes a state observing unit 25 and a learning unit 21. The state observing unit 25 acquires from the analysis unit 12 the reference current value C1 of (A3) and the reference current value C2 of (A5) out of the command arguments.

The state observing unit 25 acquires the grasp waiting time 61 and the release waiting time 62 from the control unit 13, and acquires the FB current 55 from the drive unit 37. The state observing unit 25 uses the FB current 55 and the reference current value C1 when determining whether or not the grasping of the workpiece 40 by the spindle chuck 31 is completed. In addition, the state observing unit 25 uses the FB current 55 and the reference current value C2 when determining whether or not the releasing of the workpiece 40 by the loader chuck 32 is completed.

In addition, when the learning unit 21 learns the grasp waiting time 61 and the release waiting time 62, the state observing unit 25 observes as a state variable 56A the grasp waiting time 61 and the FB current 55 at the time of grasping operation, observes as a state variable 56B the release waiting time 62 and the FB current 55 at the time of releasing operation, and sends the state variables 56A and 56B that are observation results to the learning unit 21. That is, the state variable 56A sent to the learning unit 21 by the state observing unit 25 includes the grasp waiting time 61 and the FB current 55 at the time of the grasping operation, and the state variable 56B includes the release waiting time 62 and the FB current 55 at the time of the releasing operation.

In a case where the grasp waiting time 61 is too short, the loader chuck 32 pulls back the workpiece 40 to the plus side in the Z axis direction before the spindle chuck 31 grasps the workpiece 40, so that the FB current 55 is less than the reference current value C1. On the other hand, in a case where the grasp waiting time 61 is sufficiently long, the loader chuck 32 tries to pull back the workpiece 40 to the plus side in the Z axis direction after the spindle chuck 31 grasps the workpiece 40, so that the FB current 55 becomes greater than or equal to the reference current value C1.

In addition, in a case where the release waiting time 62 is too short, the loader chuck 32 tries to pull back the workpiece 40 to the plus side in the Z axis direction before the loader chuck 32 releases the workpiece 40, so that the FB current 55 is greater than the reference current value C1. On the other hand, in a case where the release waiting time 62 is sufficiently long, the loader chuck 32 pulls back the workpiece 40 to the plus side in the Z axis direction after the loader chuck 32 releases the workpiece 40, so that the FB current 55 becomes less than or equal to the reference current value C1.

Thus, in a case where the FB current 55 during closing operation of the spindle chuck 31 is less than the reference current value C1, the state observing unit 25 determines that the spindle chuck 31 has not completed the grasping of the workpiece 40, that is, the grasping is unsuccessful. In addition, in a case where the FB current 55 during opening operation of the loader chuck 32 is greater than the reference current value C2, the state observing unit 25 determines that the loader chuck 32 has not completed the releasing of the workpiece 40, that is, the releasing is unsuccessful. The state observing unit 25 sends to the control unit 13 the determination result of the grasping and the determination result of the releasing.

The learning unit 21 learns the action 58A that is the grasp waiting time 61 of the next time in accordance with the state variable 56A, and learns the action 58B that is the release waiting time 62 of the next time in accordance with the state variable 56B. That is, the learning unit 21 learns the grasp waiting time 61 during which the spindle chuck 31 can complete the grasping of the workpiece 40 and that can shorten the grasp waiting time 61, and the release waiting time 62 during which the loader chuck 32 can complete the releasing of the workpiece 40 and that can shorten the release waiting time 62.

Specifically, the learning unit 21 learns the action 58A in accordance with a data set that is created based on the state variable 56A including the grasp waiting time 61 and the FB current 55 at the time of the grasping operation. In addition, the learning unit 21 learns the action 58B in accordance with a data set that is created based on the state variable 56B including the release waiting time 62 and the FB current 55 at the time of the releasing operation. The learning unit 21 includes a function updating unit 22 and a reward calculating unit 23.

The reward calculating unit 23 calculates a reward 57A based on the state variable 56A, and calculates a reward 57B based on the state variable 56B. That is, the reward calculating unit 23 calculates the reward 57A for the grasping operation, based on the grasp waiting time 61 and the FB current 55 at the time of the grasping operation, and calculates the reward 57B for the releasing operation, based on the release waiting time 62 and the FB current 55 at the time of the releasing operation. The reward calculating unit 23 increases the reward 57A for the grasping operation as the grasp waiting time 61 is shorter. In addition, the reward calculating unit 23 increases the reward 57B for the releasing operation as the release waiting time 62 is shorter.

The function updating unit 22 stores a function for determining the actions 58A and 58B, updates the function for determining the action 58A on the basis of the reward 57A, and updates the function for determining the action 58B on the basis of the reward 57B. An example of the function for determining the actions 58A and 58B is an action value function Q(st, at) to be described later. The function updating unit 22 of the present embodiment updates the action value function Q(s, a) so that the grasp waiting time 61 and the release waiting time 62 are shortened each time the transfer operation of the workpiece 40 is repeated in the machine tool 2. The function updating unit 22 calculates the actions 58A and 58B by using the action value function Q(s, a) updated. The function updating unit 22 sends to the control unit 13 the actions 58A and 58B calculated, and sends to the storage unit 14 learning data up to the previous time, data to be used for learning, and data necessary for controlling the loader 36. An example of the learning data is the grasp waiting time 61 and the release waiting time 62 for the next time calculated in a case where the transfer is successful, and an example of the data to be used for learning is the action value function Q(s, a) to be used for learning by the learning unit 21. Examples of the data to be used for controlling the loader 36 are (A1) to (A6) of the dedicated command described above. The storage unit 14 stores the learning data up to the previous time, the data to be used for learning, and the data necessary for controlling the loader 36 by the control unit 13. Incidentally, an action value function Q(st, at) for determining the action 58A and an action value function Q(st, $a_r$) for determining the action 58B may be functions different from each other.

Figure 3:
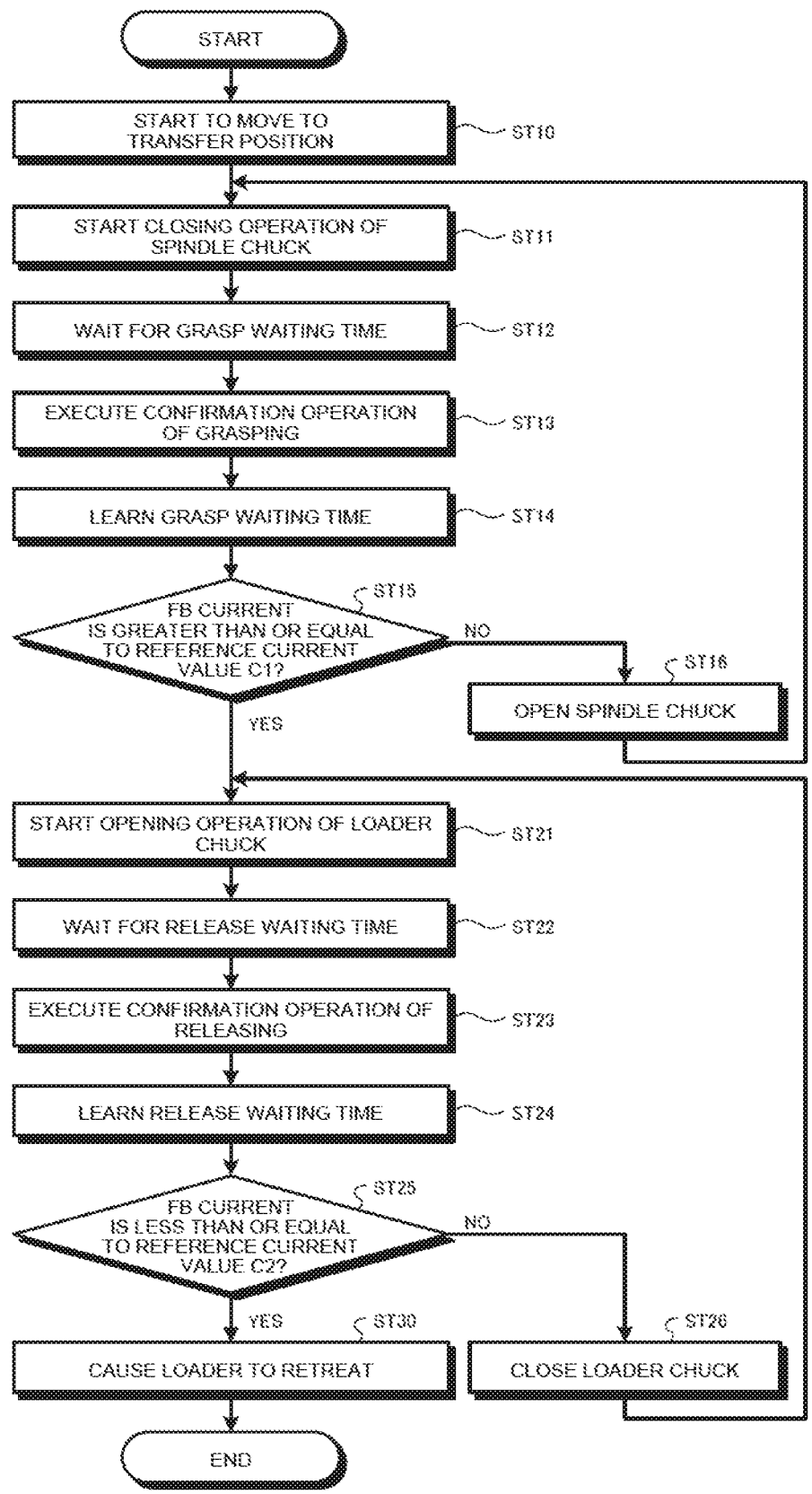
FIG. 3 is a flowchart illustrating an operation procedure of the machining system according to the embodiment.

Next, an operation procedure will be described of the machining system 1. FIG. 3 is a flowchart illustrating the operation procedure of the machining system according to the embodiment. When reading the loading command 60, in a case where the transfer of the workpiece 40 is performed for the first time, that is, in a case of unlearned, the numerical control device 10 starts to move the loader 36 to the transfer position commanded by the position command 53 of (A9) described above (step ST10). At this time, the control unit 13 sends the position command 53 to the drive unit 37. As a result, the loader 36 moves in the X axis direction while the loader chuck 32 grasps the workpiece 40, and then moves in the Z axis direction.

When the workpiece 40 starts to move, the drive unit 37 acquires the FB current 55 at each specific period and sends the FB current 55 to the state observing unit 25. As a result, the state observing unit 25 monitors the FB current 55.

The control unit 13 sends the spindle closing command 64 to the sequence control unit 15, and the sequence control unit 15 causes the spindle chuck 31 to start closing operation (step ST11). Then, the control unit 13 waits for the grasp waiting time 61 (step ST12). At this time, the control unit 13 sends the grasp waiting time 61 to the state observing unit 25. Incidentally, in the case where the transfer of the workpiece 40 is performed for the first time, that is, in the case of unlearned, the control unit 13 waits for the grasp waiting time 61 of (A1) described above. At the time of the second and subsequent transfer of the workpiece 40, the control unit 13 waits for the action 58A that is the grasp waiting time 61 of the next time given from the machine learning device 20.

When the grasp waiting time 61 has elapsed, the control unit 13 executes the confirmation operation of grasping (step ST13). Specifically, the control unit 13 sends to the drive unit 37 a position command for pulling back the loader chuck 32 by the movement amount L1 to the plus side in the Z axis direction. The state observing unit 25 sends to the learning unit 21 the state variable 56A including the FB current 55 at this time and the reference current value C1. As a result, the learning unit 21 learns the grasp waiting time 61 appropriate in accordance with the state variable 56A (step ST14). In a case where the grasping of the workpiece 40 is unsuccessful, the learning unit 21 sets the reward 57A having a smaller value for the grasp waiting time 61 used for the transfer, and in a case where the grasping of the workpiece 40 is successful, the learning unit 21 sets the reward 57A having a larger value for the grasp waiting time 61 used for the transfer. Then, the learning unit 21 determines the action 58A that is the grasp waiting time 61 of the next time so that the reward 57A for the grasping operation is maximized.

That is, the numerical control device 10 causes the transfer of the workpiece 40 to be executed with the grasp waiting time 61 for which a certain value is set, and in a case where the grasping is successful in operation confirmation of the grasping, sets the grasp waiting time 61 shorter, and in a case where the grasping is unsuccessful in the operation confirmation of the grasping, sets the grasp waiting time 61 longer. The numerical control device 10 performs learning by repeating these setting processes so that the numerical control device 10 can use the result of the learning to perform transfer with the grasp waiting time 61 that is optimum, at the time of transfer in actual product machining. As described above, the numerical control device 10 learns the grasp waiting time 61 so that the grasp waiting time 61 decreases. The numerical control device 10 may learn the grasp waiting time 61 before executing the actual product machining or may learn the grasp waiting time 61 when executing the actual product machining. Alternatively, the numerical control device 10 may learn the grasp waiting time 61 both before executing the actual product machining and when executing the actual product machining.

In addition, the state observing unit 25 determines whether or not the FB current 55 when executing the confirmation operation of grasping is greater than or equal to the reference current value C1 (step ST15). In a case where the FB current 55 is less than the reference current value C1 (step ST15, No), the control unit 13 sends the spindle opening command 63 to the spindle chuck 31, thereby causing the spindle chuck 31 to open (step ST16).

Thereafter, the machining system 1 repeats the processing of steps ST11 to ST15. Then, when the FB current 55 becomes greater than or equal to the reference current value C1 (step ST15, Yes), the control unit 13 sends the loader opening command 65 to the sequence control unit 15, and the sequence control unit 15 causes the loader chuck 32 to start opening operation (step ST21). Then, the control unit 13 waits for the release waiting time 62 (step ST22). At this time, the control unit 13 sends the release waiting time 62 to the state observing unit 25. Incidentally, in the case where the transfer of the workpiece 40 is performed for the first time, that is, in the case of unlearned, the control unit 13 waits for the release waiting time 62 of (A2) described above. At the time of the second and subsequent transfer of the workpiece 40, the control unit 13 waits for the action 58B that is the release waiting time 62 of the next time given from the machine learning device 20.

When the release waiting time 62 has elapsed, the control unit 13 executes the confirmation operation of releasing (step ST23). Specifically, the control unit 13 sends to the drive unit 37 a position command for pulling back the loader chuck 32 by the movement amount L2 to the plus side in the Z axis direction. The state observing unit 25 sends to the learning unit 21 the state variable 56B including the FB current 55 at this time and the reference current value C2. As a result, the learning unit 21 learns the release waiting time 62 appropriate in accordance with the state variable 56B (step ST24). In a case where the releasing of the workpiece 40 is unsuccessful, the learning unit 21 sets the reward 57B having a smaller value for the release waiting time 62 used for the transfer, and in a case where the releasing of the workpiece 40 is successful, the learning unit 21 sets the reward 57B having a larger value for the release waiting time 62 used for the transfer. Then, the learning unit 21 determines the action 58B that is the release waiting time 62 of the next time so that the reward 57B for the releasing operation is maximized.

That is, the numerical control device 10 causes the transfer of the workpiece 40 to be executed with the release waiting time 62 for which a certain value is set, and in a case where the releasing is successful in operation confirmation of the releasing, sets the release waiting time 62 shorter, and in a case where the releasing is unsuccessful in the operation confirmation of the releasing, sets the release waiting time 62 longer. The numerical control device 10 performs learning by repeating these setting processes so that the numerical control device 10 can use the result of the learning to perform transfer with the release waiting time 62 that is optimum, at the time of transfer in the actual product machining. As described above, the numerical control device 10 learns the release waiting time 62 so that the release waiting time 62 decreases. The numerical control device 10 may learn the release waiting time 62 before executing the actual product machining or may learn the release waiting time 62 when executing the actual product machining. Alternatively, the numerical control device 10 may learn the release waiting time 62 both before executing the actual product machining and when executing the actual product machining.

In addition, the state observing unit 25 determines whether or not the FB current 55 when executing the confirmation operation of releasing is less than or equal to the reference current value C2 (step ST25). In a case where the FB current 55 is greater than the reference current value C2 (step ST25, No), the control unit 13 sends the loader closing command 66 to the loader chuck 32, thereby causing the loader chuck 32 to close (step ST26).

Thereafter, the machining system 1 repeats the processing of steps ST21 to ST25. Then, when the FB current 55 becomes less than or equal to the reference current value C2 (step ST25, Yes), the control unit 13 causes the loader 36 to retreat to the plus side in the Z axis direction (step ST30). As a result, a sequence of the dedicated command is completed.

Incidentally, the machine learning device 20 does not have to perform learning of the grasp waiting time 61 and the release waiting time 62 at every transfer. The machine learning device 20 only needs to learn the grasp waiting time 61 and the release waiting time 62 at a rate of once every specific number of times for the transfer of the workpiece 40. The machine learning device 20 may change learning frequency depending on the amount of change in the reward 57A, 57B, the grasp waiting time 61, or the release waiting time 62.

Incidentally, when the workpiece 40 is unloaded from the spindle chuck 31 to the loader 36, the machine learning device 20 also learns the grasp waiting time 61 and the release waiting time 62 by processing similar to a case where the workpiece 40 is loaded from the loader 36 to the spindle chuck 31.

Here, a learning process will be described of the actions 58A and 58B by the learning unit 21. A learning algorithm to be used for the learning unit 21 may be any learning algorithm. Here, a case will be described where reinforcement learning is applied to the learning algorithm. In the reinforcement learning, an agent that is an action entity in a certain environment observes a current state indicated by the state variables 56A and 56B, and determines the actions 58A and 58B to be taken, based on an observation result. The agent obtains rewards 57A and 57B from the environment by selecting the actions 58A and 58B, and learns a measure by which the rewards 57A and 57B are obtained most through a series of the actions 58A and 58B. As representative methods of reinforcement learning, Q-learning and TD-learning are known. For example, in the case of Q-learning, a general update formula (action value table) of the action value function Q(s, a) is expressed by a formula (1) below. That is, an example of the action value table is the action value function Q(s, a) of the formula (1).

[Formula 1]

$$Q(s_t, a_t) \leftarrow Q(s_t, a_t) + \alpha(r_{t+1} + \gamma \max Q(s_{t+1}, a) - Q(s_t, a_t)) \qquad (1)$$

In the formula (1), the symbol "st" represents the environment at time t, and the symbol "at" represents the action at the time t. By the action at, the environment changes to st+1. The symbol "rt+1" represents rewards 57A and 57B that can be received due to the change in the environment, the symbol "γ" represents a discount rate, and the symbol "α" represents a learning coefficient. When Q-learning is applied, the grasp waiting time 61 of the next time and the release waiting time 62 of the next time of the transfer operation are the action $a_t$.

If an action value of the best action a at time t+1 is greater than an action value Q of the action a executed at the time t, the update formula represented by the formula (1) increases the action value Q, and in the opposite case, decreases the action value Q. In other words, the action value function Q(s, a) is updated so that the action value Q of the action a at the time t becomes close to the best action value at the time t+1. As a result, the best action value in a certain environment will be propagated to the action value in the previous environment in order.

Based on the grasp waiting time 61 and the FB current 55 at the time of the grasping operation, the reward calculating unit 23 calculates the reward 57A for the grasping operation, and based on the release waiting time 62 and the FB current 55 at the time of the releasing operation, the reward calculating unit 23 calculates the reward 57B for the releasing operation.

When the FB current 55 becomes greater than or equal to the reference current value C1 with the grasp waiting time 61 shorter than the shortest grasp waiting time 61 with which the grasping has been successful so far, the reward calculating unit 23 increases the reward 57A for the grasping operation. At this time, the reward calculating unit 23 gives the reward 57A of "1", for example. In addition, when the FB current 55 becomes less than or equal to the reference current value C2 with the release waiting time 62 shorter than the shortest release waiting time 62 with which the releasing has been successful so far, the reward calculating unit 23 increases the reward 57B for the releasing operation. At this time, the reward calculating unit 23 gives the reward 57B of "1", for example.

On the other hand, when the FB current 55 is less than the reference current value C1, the reward calculating unit 23 decreases the reward 57A for the grasping operation. At this time, the reward calculating unit 23 gives the reward 57A of "−1", for example. In addition, when the FB current 55 is greater than the reference current value C2, the reward calculating unit 23 decreases the reward 57B for the releasing operation. At this time, the reward calculating unit 23 gives the reward 57B of "−1", for example.

When the grasp waiting time 61 is zero and the FB current 55 is greater than or equal to the reference current value C1, for example, the reward calculating unit 23 sets the reward 57A for the grasping operation as the maximum reward. In addition, when the release waiting time 62 is zero and the FB current 55 is less than or equal to the reference current value C2, the reward calculating unit 23 sets the reward 57B for the releasing operation as the maximum reward.

When the FB current 55 at the time of the grasping operation is less than the reference current value C1, the reward calculating unit 23 regards that the grasping is unsuccessful, so that the reward 57A for the grasping operation is set as the minimum reward. In addition, when the FB current 55 at the time of the releasing operation is greater than the reference current value C2, the reward calculating unit 23 regards that the releasing is unsuccessful, so that the reward 57B for the releasing operation is set as the minimum reward. The reward calculating unit 23 sends the rewards 57A and 57B calculated to the function updating unit 22.

The function updating unit 22 updates the function for determining the action 58A in accordance with the reward 57A calculated by the reward calculating unit 23, and updates the function for determining the action 58B in accordance with the reward 57B calculated by the reward calculating unit 23. For example, in the case of Q-learning, the action value function $Q(st, a_t)$ represented by the formula (1) is a function for calculating the actions 58A and 58B, and is updated by the function updating unit 22.

Figure 4:
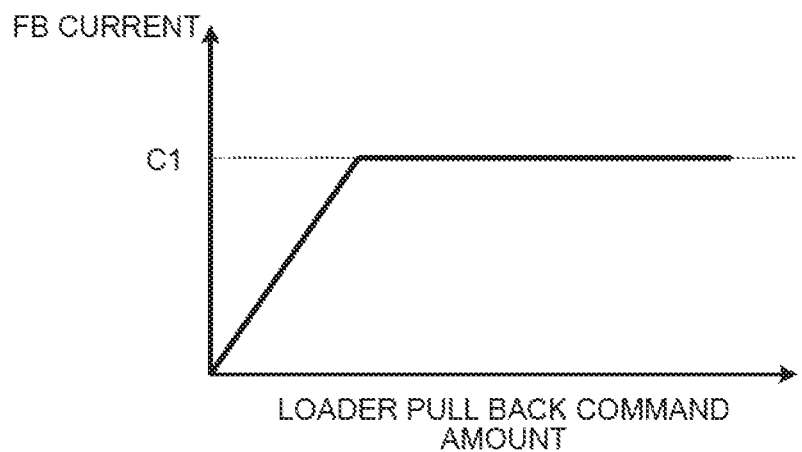
FIG. 4 is a diagram illustrating a relationship between a loader pull back command amount and a FB current in a case where a spindle chuck has completed grasping in the machining system according to the embodiment.

Here, a relationship will be described between the amount of pulling back the loader chuck 32 to the plus side in the Z axis direction along a loader axis that is a rotation axis of the loader 36, and the FB current 55. Hereinafter, a command amount specifying a pull back amount to the loader chuck 32 is referred to as a loader pull back command amount. FIG. 4 is a diagram illustrating a relationship between the loader pull back command amount and the FB current in a case where the spindle chuck has completed the grasping in the machining system according to the embodiment. In FIG. 4 and FIGS. 5 to 7 to be described later, the horizontal axis indicates the loader pull back command amount, and the vertical axis indicates the FB current 55.

In a case where the spindle chuck 31 has completed the grasping of the workpiece 40, when the machine tool 2 tries to pull back the loader chuck 32, the FB current 55 increases. Specifically, when pulling back of the loader chuck 32 is started from a state where the loader chuck 32 is stopped, the FB current 55 increases as the loader pull back command amount increases, and thereafter the FB current 55 becomes constant at a value greater than or equal to the reference current value C1. Thus, in a case where the FB current 55 becomes greater than or equal to the reference current value C1, the state observing unit 25 can determine that the spindle chuck 31 has completed the grasping of the workpiece 40. In this case, the reward calculating unit 23 increases the reward 57A as the grasp waiting time 61 is shorter.

Figure 5:
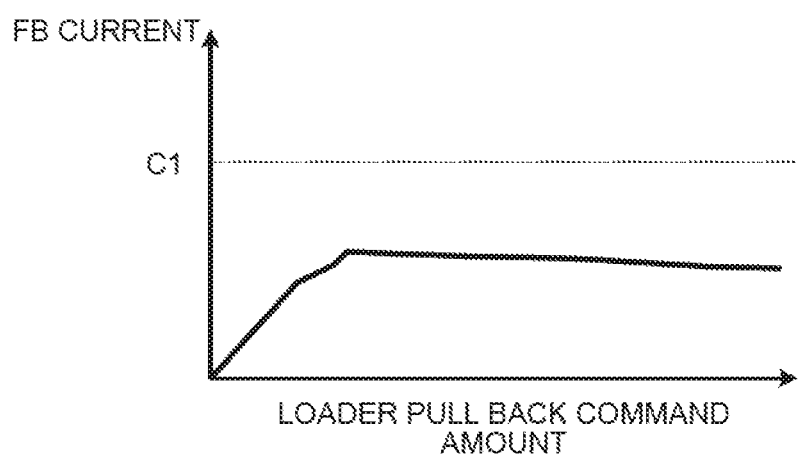
FIG. 5 is a diagram illustrating a relationship between the loader pull back command amount and the FB current in a case where the spindle chuck has not completed the grasping in the machining system according to the embodiment.

FIG. 5 is a diagram illustrating a relationship between the loader pull back command amount and the FB current in a case where the spindle chuck has not completed the grasping in the machining system according to the embodiment. In a case where the spindle chuck 31 has not completed the grasping of the workpiece 40, when the machine tool 2 tries to pull back the loader chuck 32, the loader chuck 32 can pull back the workpiece 40 with a small force. For this reason, the FB current 55 becomes less than the reference current value C1. Thus, in a case where the FB current 55 remains less than the reference current value C1, the state observing unit 25 can determine that the spindle chuck 31 has not completed the grasping of the workpiece 40. In this case, the reward calculating unit 23 decreases the reward 57A regardless of the length of the grasp waiting time 61.

Figure 6:
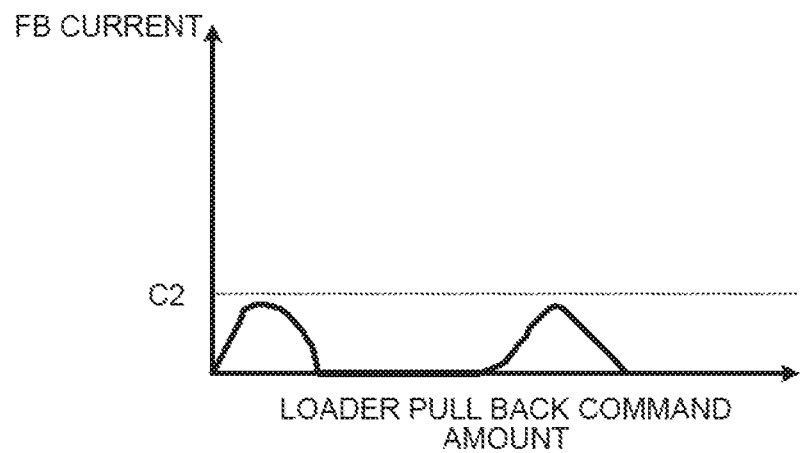
FIG. 6 is a diagram illustrating a relationship between the loader pull back command amount and the FB current in a case where the loader chuck has completed releasing in the machining system according to the embodiment.

FIG. 6 is a diagram illustrating a relationship between the loader pull back command amount and the FB current in a case where the loader chuck has completed the releasing in the machining system according to the embodiment. In a case where the loader chuck 32 has completed the releasing of the workpiece 40, when the machine tool 2 tries to pull back the loader chuck 32, force is required to accelerate the loader chuck 32, so that the FB current 55 temporarily increases. When the speed of the loader chuck 32 becomes constant, because the loader chuck 32 does not grasp the workpiece 40, little force is required for moving the loader chuck 32, and the FB current 55 becomes substantially zero. Thereafter, when it is tried to end the pulling back of the loader chuck 32, force is required to decelerate the loader chuck 32, so that the FB current 55 temporarily rises. As described above, in acceleration and deceleration of the loader chuck 32, although the FB current 55 temporarily rises, the FB current 55 remains less than or equal to the reference current value C2. Thus, in a case where the FB current 55 is less than or equal to the reference current value C2, the state observing unit 25 can determine that the loader chuck 32 has completed the releasing of the workpiece 40. In this case, the reward calculating unit 23 increases the reward 57B as the release waiting time 62 is shorter.

Figure 7:
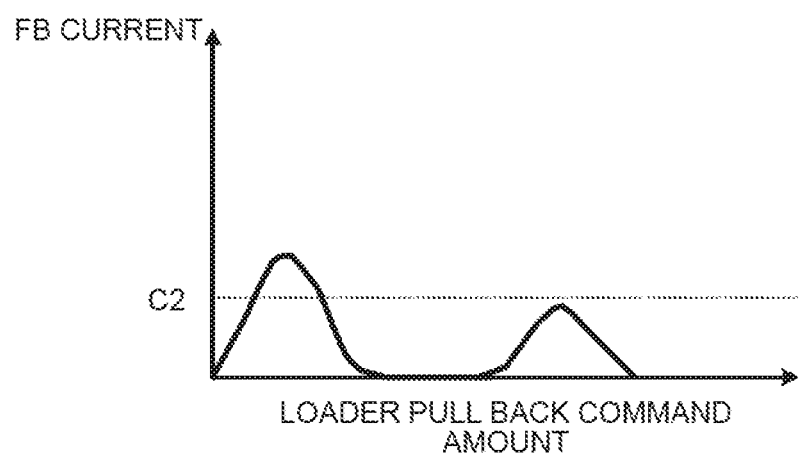
FIG. 7 is a diagram illustrating a relationship between the loader pull back command amount and the FB current in a case where the loader chuck has not completed the releasing in the machining system according to the embodiment.

FIG. 7 is a diagram illustrating a relationship between the loader pull back command amount and the FB current in a case where the loader chuck has not completed the releasing in the machining system according to the embodiment. In a case where the loader chuck 32 has not completed the releasing of the workpiece 40, when the machine tool 2 tries to pull back the loader chuck 32, force is required to accelerate the loader chuck 32, so that the FB current 55 temporarily rises. At this time, because the loader chuck 32 is pulled back while grasping the workpiece 40, there is a time period during which the FB current 55 increases as compared with a case where the workpiece 40 is not grasped, and becomes greater than the reference current value C2. Thus, in a case where the FB current 55 becomes greater than the reference current value C2, the state observing unit 25 can determine that the loader chuck 32 has not completed the releasing of the workpiece 40. In this case, the reward calculating unit 23 decreases the reward 57B regardless of the length of the release waiting time 62.

As described above, the machine learning device 20 confirms whether or not the workpiece 40 has been grasped by the spindle chuck 31, and in a case where the grasping of the workpiece 40 has not completed, the machine learning device 20 executes the grasping of the workpiece 40 again in accordance with the grasp waiting time 61, so that the grasp waiting time 61 can be corrected. In addition, because the machine learning device 20 learns the grasp waiting time 61, unsuccessful grasping can be prevented. In addition, because the machine learning device 20 is enabled to execute the grasping of the workpiece 40 again and prevent the unsuccessful grasping, productivity by the machine tool 2 is improved.

Similarly, the machine learning device 20 confirms whether or not the workpiece 40 has been released by the loader chuck 32, and in a case where the releasing of the workpiece 40 has not completed, the machine learning device 20 executes the releasing of the workpiece 40 again in accordance with the release waiting time 62, so that the release waiting time 62 can be corrected. In addition, because the machine learning device 20 learns the release waiting time 62, unsuccessful releasing can be prevented. In addition, because the machine learning device 20 is enabled to execute the releasing of the workpiece 40 again and prevent the unsuccessful releasing, productivity by the machine tool 2 is improved.

In addition, because the machine learning device 20 determines the grasping and releasing of the workpiece 40, based on the FB current 55, it is unnecessary to provide a special mechanism or device such as a camera for confirming the grasping and releasing of the workpiece 40. Thus, the grasping and releasing of the workpiece 40 can be confirmed at low cost.

In addition, in a case where the grasping of the workpiece 40 is unsuccessful, the machine learning device 20 causes the grasping of the workpiece 40 to be executed again in accordance with the grasp waiting time 61, so even in a case where the grasp waiting time 61 is too short, there is no need to perform manual recovery.

In addition, in a case where the releasing of the workpiece 40 is unsuccessful, the machine learning device 20 causes the releasing of the workpiece 40 to be executed again in accordance with the release waiting time 62, so even in a case where the release waiting time 62 is too short, there is no need to perform manual recovery. Thus, the time required for the transfer of the workpiece 40 can be shortened, and degradation in productivity can be suppressed.

Figure 8:
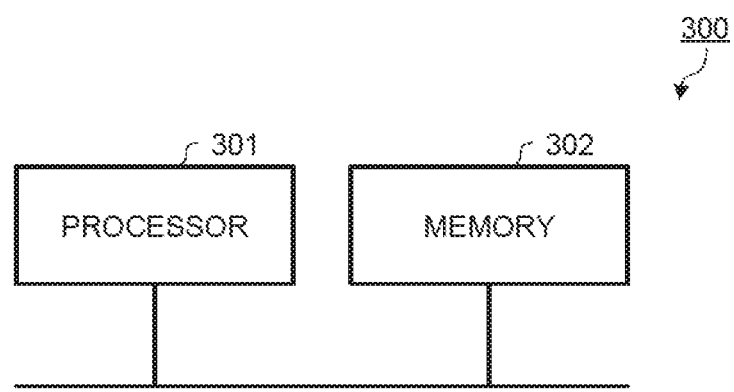
FIG. 8 is a diagram illustrating a hardware configuration example of the numerical control device according to the embodiment.

Here, a hardware configuration will be described of the numerical control device 10. FIG. 8 is a diagram illustrating a hardware configuration example of the numerical control device according to the embodiment.

The numerical control device 10 can be implemented by a control circuit 300 illustrated in FIG. 8, that is, a processor 301 and a memory 302. An example of the processor 301 is a central processing unit (CPU), a central processing device, a processing device, an arithmetic device, a microprocessor, a microcomputer, a processor, a digital signal processor (DSP), or a system large scale integration (LSI). Examples of the memory 302 are a random access memory (RAM) and a read only memory (ROM).

The numerical control device 10 is implemented by the processor 301 reading and executing a program stored in the memory 302 for executing operation of the numerical control device 10. In addition, it can also be said that this program causes the computer to execute a procedure or a method of the numerical control device 10. The memory 302 is also used as a temporary memory when the processor 301 executes various types of processing.

Incidentally, functions of the numerical control device 10 may be implemented partially by dedicated hardware and partially by software or firmware. Note that, the machine learning device 20 may be implemented by the control circuit 300 illustrated in FIG. 8.

Incidentally, in a case where the spindle chuck 31 is an electric chuck, the grasping operation and the releasing operation of the workpiece 40 can also be detected on the spindle chuck 31 side. In this case, the machine learning device 20 may learn the grasp waiting time 61 and the release waiting time 62, based on the FB current detected on the spindle chuck 31 side.

In the present embodiment, a case has been described where the machine learning device 20 performs machine learning using reinforcement learning; however, the machine learning device 20 may perform machine learning in accordance with other known methods such as a neural network, genetic programming, functional logical programming, a support vector machine, and the like.

As described above, according to the embodiment, the grasp waiting time 61 and the release waiting time 62 are learned with which the transfer time of the workpiece 40 between the chucks is shortened, in accordance with the data set created based on the state variables 56A and 56B, so that the transfer of the workpiece 40 can be completed in a short time.

The configuration described in the above embodiment describes an example of contents of the present invention, and can be combined with other known techniques, and also a part of the configuration can be omitted or modified without departing from the gist of the present invention.

REFERENCE SIGNS LIST 1 machining system; 2 machine tool; 3 control system; 10 numerical control device; 11 control machining program storage unit; 12 analysis unit; 13 control unit; 14 storage unit; 15 sequence control unit; 20 machine learning device; 21 learning unit; 22 function updating unit; 23 reward calculating unit; 25 state observing unit; 31 spindle chuck; 32 loader chuck; 35 rotating part; 36 loader; 37 drive unit; 38 servomotor; 40 workpiece; 52 transfer position information; 53 position command; 55 FB current; 56A, 56B state variable; 57A, 57B reward; 58A, 58B action; 61 grasp waiting time; 62 release waiting time; 63 spindle opening command; 64 spindle closing command; 65 loader opening command; 66 loader closing command.

The invention claimed is:

1. A machine learning device configured to learn a waiting time for at least one of grasping a workpiece by a second chuck or releasing the workpiece by a first chuck during transfer of the workpiece between the first chuck configured to grasp and send the workpiece and the second chuck configured to grasp and receive the workpiece, the machine learning device comprising:
a first processor configured to execute a first program; and
a first memory storing the first program which, when executed by the first processor, performs processes of:
observing the waiting time and a feedback current from a drive mechanism that moves the first chuck, as state variables;
amending, using a learning process, the waiting time such that a transfer time of the workpiece is shortened, in accordance with a data set created based on the state variables; and
operating at least one of the second chuck to grasp the workpiece after waiting the amended waiting time or the first chuck to release the workpiece after waiting the amended waiting time.

2. A numerical control device comprising:
a machine learning device according to claim 1; and
a second processor configured to execute a second program; and
a second memory configured to store the second program which, when executed by the second processor, performs processes of:
controlling the grasping the workpiece by the second chuck and the releasing the workpiece by the first chuck, based on the amended waiting time.

3. The numerical control device according to claim 2, wherein
the first processor further performs:
calculating a reward, based on the waiting time and the feedback current, and
updating a function for determining the waiting time, based on the reward.

4. The numerical control device according to claim 3, wherein
the amended waiting time is a first waiting time when the workpiece is grasped by the second chuck, and
the first processor, in a case where the feedback current is greater than or equal to a first reference current value, increases the reward when the first waiting time is shorter than a shortest amended waiting time having been amended so far, and in a case where the feedback current is less than the first reference current value, decreases the reward.

5. The numerical control device according to claim 4, wherein
the first processor determines that the grasping is unsuccessful in a case where the feedback current is less than the first reference current value when the workpiece is grasped by the second chuck, and
when it is determined that the grasping is unsuccessful, the first processor amends the first waiting time, and the second processor retries the grasping with the amended first waiting time.

6. The numerical control device according to claim 3, wherein
the amended waiting time is a second waiting time when the workpiece is released by the first chuck, and
the first processor, in a case where the feedback current is less than or equal to a second reference current value, increases the reward if the amended waiting time is shorter than a shortest amended waiting time having been amended so far, and in a case where the feedback current is greater than the second reference current value, decreases the reward.

7. The numerical control device according to claim 6, wherein
the first processor determines that the releasing is unsuccessful in a case where the feedback current is greater than the second reference current value when the workpiece is released by the first chuck, and
when it is determined that the releasing is unsuccessful, the first processor amends the second waiting time, and the second processor retries the releasing with the amended second waiting time.

8. The numerical control device according to claim 3, wherein
the first processor updates an action value table indicating the function based on the reward.

9. A machine tool to be controlled by the numerical control device according to claim 2, and to be driven by the drive mechanism.

10. A machine learning method of learning a waiting time for at least one of grasping a workpiece by a second chuck or releasing the workpiece by a first chuck during transfer of the workpiece between the first chuck configured to grasp and send the workpiece and the second chuck configured to grasp and receive the workpiece, the machine learning method comprising:
observing the waiting time and a feedback current from a drive mechanism that moves the first chuck, as state variables;
amending, using a learning process, the waiting time such that a transfer time of the workpiece is shortened, in accordance with a data set created based on the state variables; and
operating at least one of the second chuck to grasp the workpiece after waiting the amended waiting time or the first chuck to release the workpiece after waiting the amended waiting time.

11. A non-tangible computer readable medium storing a program, which when executed by a computer, causes the computer to perform a machine learning method of learning a waiting time for at least one of grasping a workpiece by a second chuck or releasing the workpiece by a first chuck during transfer of the workpiece between the first chuck configured to grasp and send the workpiece and the second chuck configured to grasp and receive the workpiece, including steps comprising:

observing the waiting time and a feedback current from a drive mechanism that moves the first chuck, as state variables;

amending, using a learning process, the waiting time such that a transfer time of the workpiece is shortened, in accordance with a data set created based on the state variables; and operating at least one of the second chuck to grasp the workpiece after waiting the amended waiting time or the first chuck to release the workpiece after waiting the amended waiting time.

* * * * *